(12) United States Patent
Lomerson, Jr. et al.

(10) Patent No.: US 6,626,630 B1
(45) Date of Patent: Sep. 30, 2003

(54) CARTESIAN ROBOT

(75) Inventors: Roland Lomerson, Jr., Bradenton, FL (US); Geoffrey James Parnel, Midlothian, VA (US); Richard Douglas Dye, Chesterfield, VA (US); James Prill, Richmond, VA (US)

(73) Assignee: Bakery Holdings LLC, Richmond, VA (US)

( * ) Notice: Subject to any disclaimer, the term of this patent is extended or adjusted under 35 U.S.C. 154(b) by 0 days.

(21) Appl. No.: 10/178,985

(22) Filed: Jun. 24, 2002

(51) Int. Cl.[7] .............................................. B66C 23/00
(52) U.S. Cl. .................... 414/749.1; 901/21; 74/490.04
(58) Field of Search .................... 414/749.1; 74/490.04, 74/490.08, 490.09; 901/21, 16

(56) References Cited

U.S. PATENT DOCUMENTS 4,507,044 A * 3/1985 Hutchins et al. .......... 901/21 X

* cited by examiner

*Primary Examiner*—Donald W. Underwood (57) ABSTRACT

A two axis, two drive mechanism, two belt design Cartesian robot wherein each axis is independently controlled and all applied forces are along the centerline of the robot structure. This unique design allows for the use of a low cost control system since a so-called "multi-axis motion controller" is not required. Co-location of the drive systems allows support of the robot from one end. Centering of forces acting on a carriage assembly allows for the reduction of the weight of the robot for a given payload.

21 Claims, 6 Drawing Sheets

CARTESIAN ROBOT

FIELD OF THE INVENTION

1) The present invention relates to the class of automated devices generally referred to as Cartesian robots that are capable of orthogonal two-axis movement, and more particularly to such devices that because of their design and configuration provide broader applicability and permit the use of lighter weight structural elements to obtain equivalent robustness.

BACKGROUND OF THE INVENTION

2) Cartesian robots are widely used in applications that fit a rectangular work envelope. Such uses include simple assembly operations, dispensing, inspection and loading and unloading of, for example, case packaging machines and the like. Such devices are generally considered a low cost robotic alternative, are relatively easy to program and are viewed as being highly precise because of their linear-motion geometry. As a consequence, they are often built into other machinery and are widely used in "pick and place" operations. While highly useful such devices are considered to require large areas in which to operate even though the whole space is not used and they require the largest surface area of any robotic device. Furthermore, they tend to be highly robust devices that are not easily rotated or otherwise moved to increase their effective work envelope due to the requirement that they include a plurality of drive devices or motors that are often located at the extremes of their various moving axes.

3) Because of their versatility and broad usage, there exists a plethora of prior art describing a wide variety of Cartesian robotic devices. Among this prior art are: U.S. Pat. No. 5,611,248 issued Mar. 17, 1998 that describes a two-axis robot comprising a pair of coupling belts, one endless and one fixed to a slide, both driven by a pair of opposing coaxially located drive motors; and U.S. Pat. No. 5.063,334 issued Nov. 5, 1991 that describes an orthogonal two-axis moving apparatus comprising a single coupling belt driven by motors located at the opposing extremities of one of two orthogonal guide members. While both of these devices provide highly useful apparatus, they each have shortcomings that will become apparent upon a reading of and in the course of the presentation of the description of the novel Cartesian robot described herein. Most importantly, the Cartesian robot of the present invention is of lower cost to manufacture and, because of the reduced weight of many of its components, a result of its unique design, reduces the need for heavy duty and fixed installation and permits increased speed of operation.

OBJECT OF THE INVENTION

4) It is therefore an object of the present invention to provide an enhanced Cartesian robot that is of lower cost to produce by virtue of its design.

5) It is another object of the present invention to provide a Cartesian robot that is significantly lighter and more manageable than similar prior art such devices.

SUMMARY OF THE INVENTION

6) The apparatus of the present invention comprises a two-axis Cartesian robot including a first guide member which extends along one direction and is attached to a stationary position, a hollow carriage which is translatable along the first guide member, and is penetrated by a second orthogonal guide member, thereby allowing the carriage to move along the first guide member on a track and relative to the second guide member. First and second idler rollers are rotatably supported on two ends of the second guide member, a third idler roller is rotatably supported on one end of the first guide member, and intermediate idler rollers are rotatably supported on four corner portions of the hollow carriage and all drive mechanisms are orthogonally positioned and located at the first guide member stationary position. A first guide member drive belt driven by a drive mechanism located at the stationary position is provided and has two ends of which are fixed to the second or opposing end of the first guide member and looped in a cross shape on the first to third idler rollers and the four intermediate idler rollers. A second guide member drive belt driven by a second drive mechanism located at the stationary point and orthogonal to the first drive mechanism has two ends fixed to opposing extremities of the hollow carriage. The second guide member penetrates the hollow carriage and is carried by guide rollers or casters along a track that forms a part of the first guide member. The symmetrical alignment of the drive forces with respect to the centerline of the hollow carriage reduces torque induced during operation and the co-location of the independent drive mechanisms at one end of the robot permits the provision of a mechanism to rotate the entire assembly about a third axis located at the stationary position and further permits reduction in the size and weight of the individual drive mechanisms and other components.

DETAILED DESCRIPTION

Figure 1:
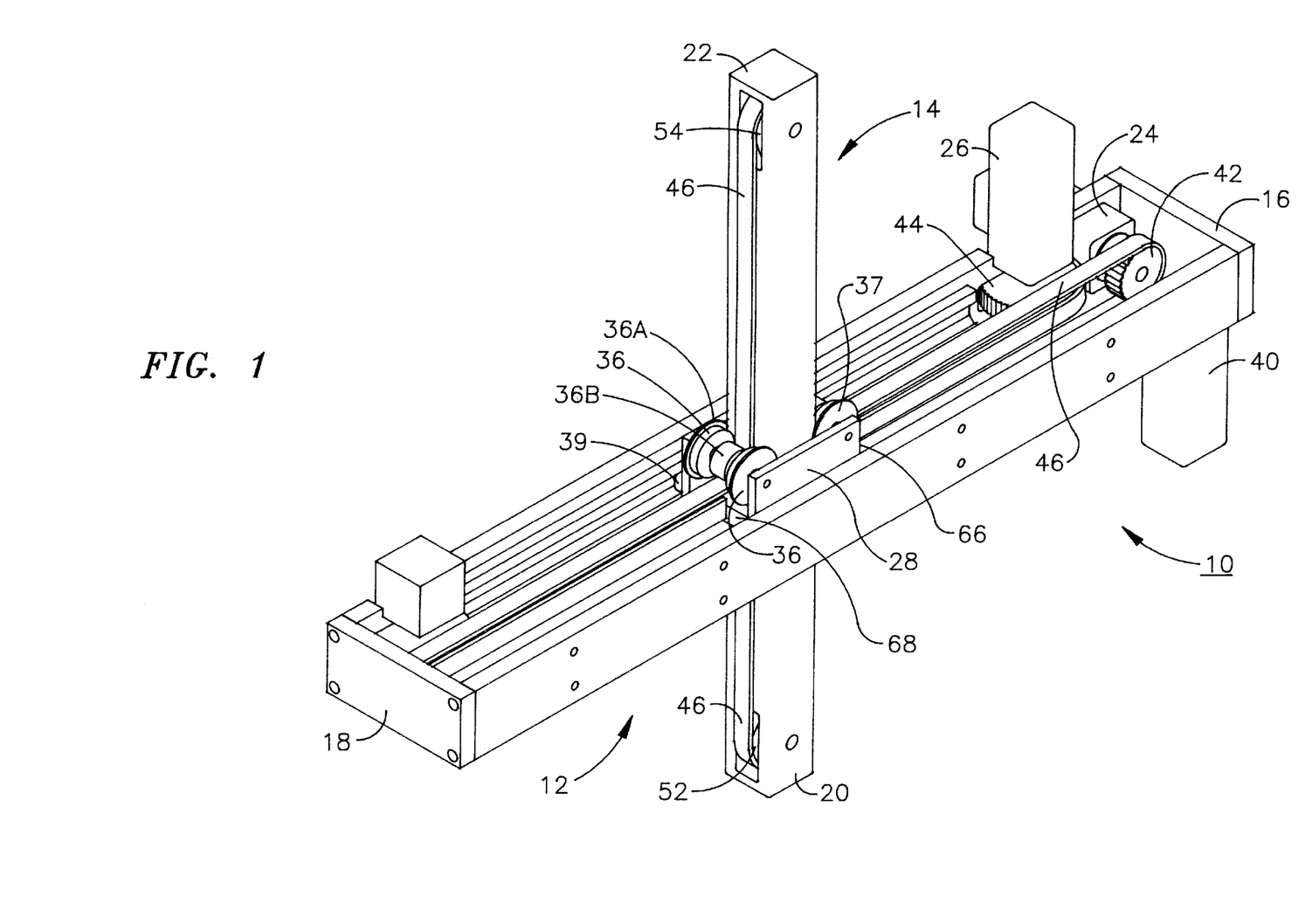
FIG. 1 is a perspective drawing of the Cartesian robot of the present invention.
Figure 2:
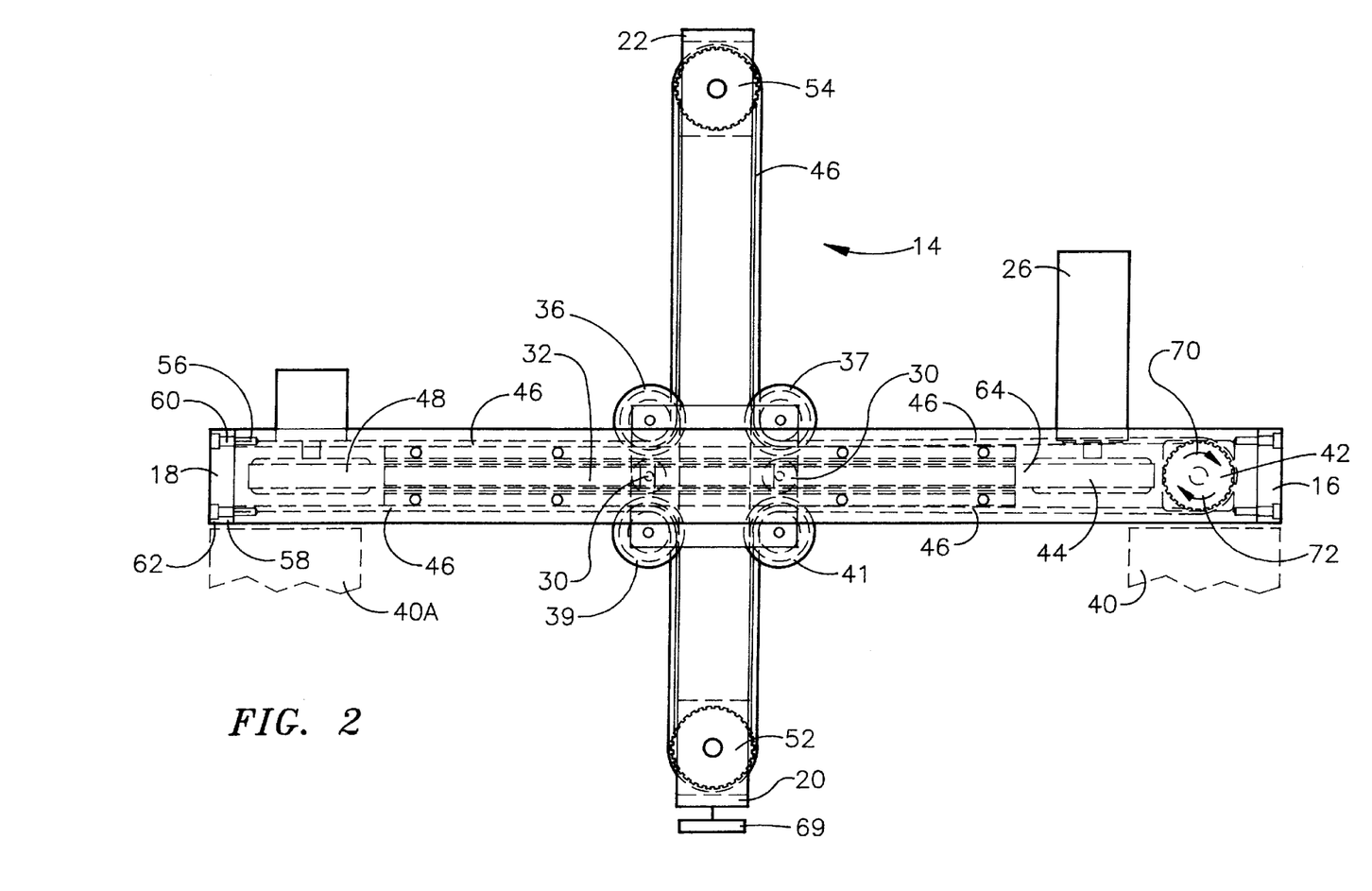
FIG. 2 is a front view of the Cartesian robot of FIG. 1.
Figure 3:
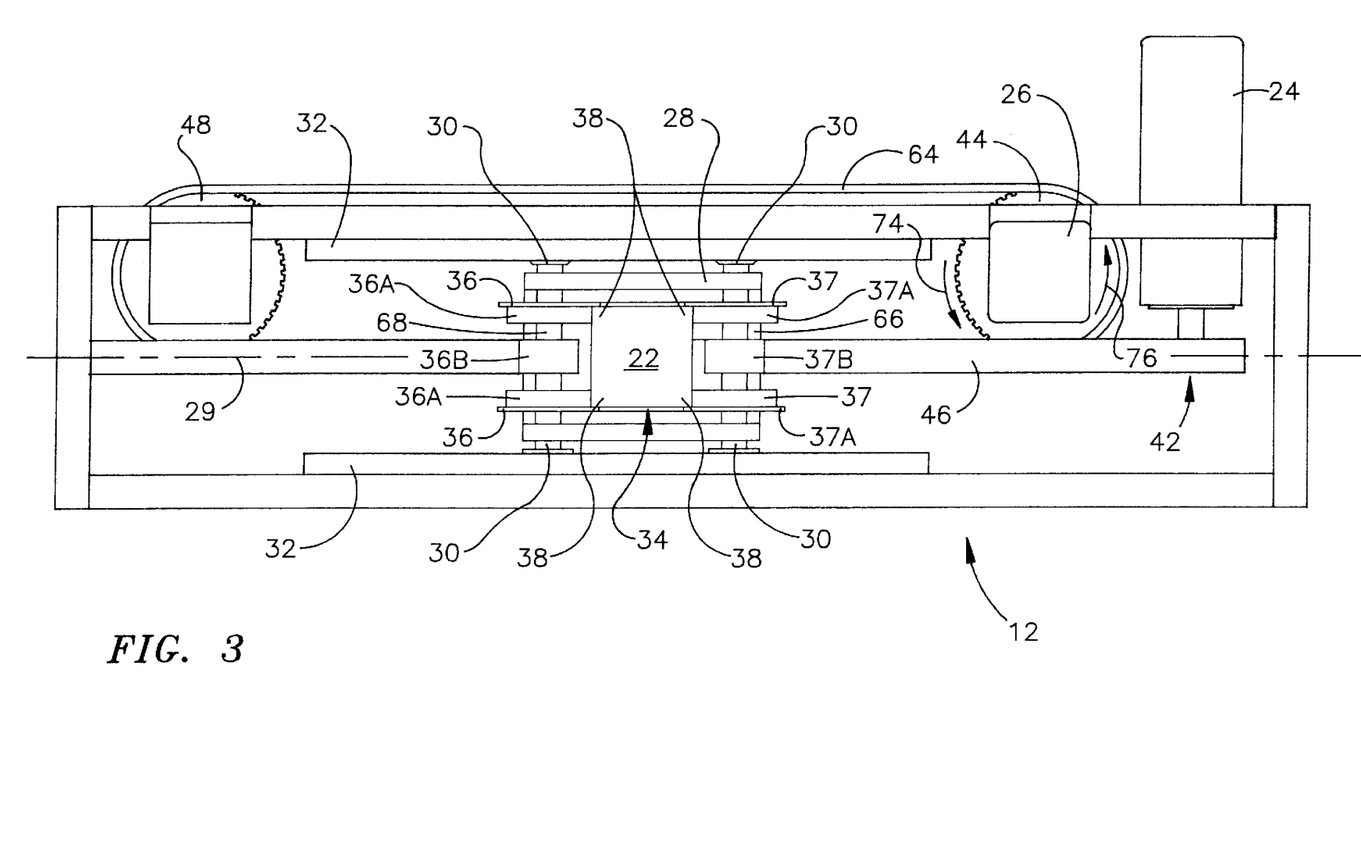
FIG. 3 is a top view of the Cartesian robot of FIG. 1.
Figure 4:
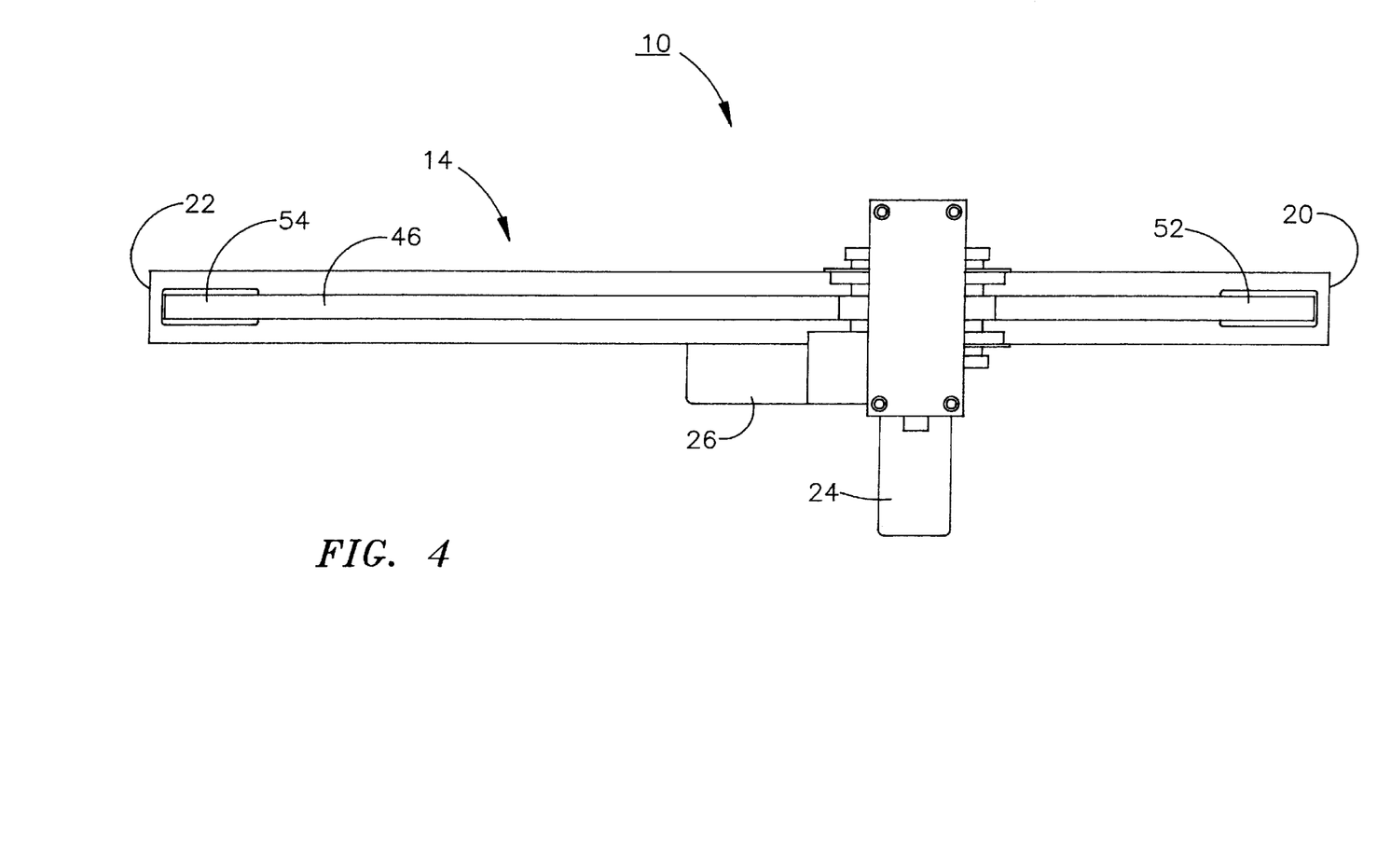
FIG. 4 is an end view of the Cartesian robot of FIG. 1.
Figure 6:
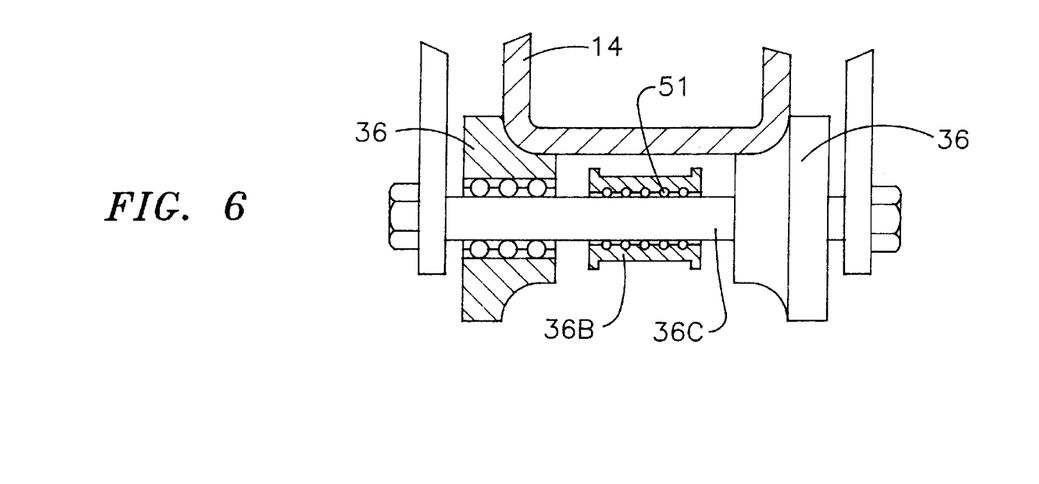
FIG. 6 is and end view of the intermediate pulley assembly of the Cartesian robot of the present invention.

14) Referring now to FIG. 1 that is a perspective view of the Cartesian robot 10 of the present invention, Cartesian robot 10 comprises a first guide member 12 (aligned along what is sometimes referred to hereinafter as the "X-axis") and a second guide member 14 (aligned along what is sometimes referred to hereinafter as the "taxis") orthogonal to each other. For reference purposes, the "Y-axis" extends into the plane of the drawing. First guide member 12 has a fixed or supporting end 16 and an opposing second or remote end 18 that may or may not be supported. Second guide member 14 has a first end 20 and a second or remote end 22. Located at first or fixed end 16 are first drive mechanism 24 and second drive mechanism 26 arranged orthogonal to each other. A carriage 28 has casters 30 (best seen in FIG. 3) that permit movement of carriage 28 along tracks 32 (also best seen in FIG. 3) on first guide member 12. Carriage 28 has a hollow center 34 through which second guide member 14 protrudes. Guide wheels 36, 37, 39 and 41 rotatably attached to carriage 28 engage corners 38 of second guide member 14 at shoulders 36A and 37A and identical shoulders on guide wheels 39 and 41 that are not shown (shoulders 36A and 37A are best seen in FIGS. 1 and 3 thereby allowing carriage 28 to move along the length of second guide member 14. At the central portions of the shafts 36C, 37C, 39C and 41C of guide wheels 36, 37, 39 and 41 are intermediate pulleys 36B, 37B, 39B and 41B about which drive belt 46 travels as described below. In FIG. 1 this element is designated as 36B, but it will be readily apparent that similar central intermediate pulleys are present on guide wheels 37, 39 and 41 although they are not clearly visible in all of the Figures. These intermediate pulleys are borne on the shafts of guide wheels 36, 37, 39 and 41 by separate bearing assemblies that permit rotation of the intermediate pulleys independently of the rotation of shafts 36C, 37C, 39C and 41C. This is best shown in FIG. 6. Because of the location of both drive mechanisms 24 and 26 at fixed end 16 of first guide member 12 it is possible to support the entire structure of Cartesian robot 10 on a single base 40 located at fixed end 16. Optionally, a second base 40A shown in phantom in FIG. 2 may be located at end 18, if required. Attached to drive mechanisms 24 and 26 are drive wheels 42 and 44 respectively. At second opposing end 18 of first guide member 12 is located idler pulley 48 (best seen in FIG. 2). At opposing ends 20 and 22 of second guide member 14 are located idler pulleys 52 and 54 respectively (best seen in FIG. 2). Drive mechanism 24 through the rotating action of drive wheel 42 that engages drive belt 46, both ends 56 and 58 of which are fastened at points 60 and 62 (best seen in FIG. 2). Drive wheels 42 and 44 are preferably toothed to engage opposing teeth in drive belts 46 and 64 that are of the type used in, for example, timing belts and similar drive belts.

15) The path of drive belt 46 beginning at fixed end 56 thereof passes around first intermediate pulley 36B upwards over idler pulley 54 downwards around intermediate pulley 37B around drive wheel 42, around intermediate pulley 41B (not clearly visible), downward around idler pulley 52 upward and about intermediate pulley 39B (not clearly visible) and thence to attachment point 62 at drive belt end 58.

16) Drive wheel 44 driven by drive mechanism 26 engages drive belt 64 in the same fashion as drive wheel 42 engages drive belt 46. The opposing ends 66 and 68 of drive belt 64 are attached to opposing sides of carriage 28. Beginning at end 66, drive belt 64 passes around drive wheel 44 toward and around idler pulley 48 and back toward end 68 attached to carriage 28 at a point on the centerline 29 of carriage 28. It is this mode of attachment to the centerline 29 of carriage 28 that provides all of the driving forces acting upon Cartesian robot 10 are centered. This permits a reduction in the strength and weight of the individual structural elements of Cartesian robot 10 without any sacrifice in the robustness of Cartesian robot 10 in terms of its ability to handle a given payload. The application of force that results from this design permits a substantially "lighter" robot to perform the task of a significantly "heavier" conventional robot with significantly reduced weight and strength in the robot of the current design. Beginning at end 66, drive belt 64 passes around drive wheel 44 toward and around idler pulley 48 and back toward end 68 attached to carriage 28.

17) With this arrangement of belts and drive members, when drive wheel 42 is rotated in the direction of arrow 70, drive belt 46 is shortened to the right in the drawing causing belt 46 to be pulled away from the location of end 56 and fed toward end 58. This action causes second guide member 14 to descend in the view depicted in FIG. 2. Conversely, when drive wheel 42 is rotated by drive mechanism 24 in the direction of arrow 72, drive belt 46 is pulled away from end 58 and fed toward end 56 causing second guide member 14 to ascend in the view depicted in FIG. 2. As guide member 14 moves upward and downward, it is guided within aperture 34 in carriage 28 by guide wheels 36, 37, 39 and 41 as previously described.

18) Drive mechanism 26 that drives drive wheel 44 and engages drive belt 64 may be run concurrently or at different times than drive mechanism 24, but unless otherwise controlled operates totally independently of drive mechanism 24 and engaged drive belt 46. When drive mechanism 26 rotates drive wheel 44 in the direction indicated by arrow 74, carriage 28 and second guide member 14 contained therein are drawn toward the right as depicted in FIGS. 2 and 3. Conversely, when drive mechanism 26 rotates drive wheel 44 in the direction indicated by arrow 76 in FIG. 3, carriage 28 and contained second guide member 14 are drawn to the left as depicted in FIGS. 2 and 3.

19) Thus, activation of both drive mechanisms 24 and 26 permits location of tool [68] 69, schematically depicted as element [68] 69, any location within the reach of Cartesian robot 10. Tool [68] 69, may be any of a widely known class of tools conventionally used in concert with robotic movement devices and include vacuum picking devices, wood and metal working tools, etc. When drive wheel 26 pulls carriage 28 to the right in the drawing, the length of belt 46 to the right of second guide member 14 is decrease and the length of belt 46 to the left of second guide member 14 is increased thus causing second guide member 14 to move to the right, without second guide member 14 moving up and down.

20) What has been described is a two axis, two drive mechanism, two belt design [Cartesisan] Cartesian robot wherein each axis is independently controlled. This unique design allows for the use of a low cost control system since a so-called "multi-axis motion controller" is not required.

Figure 5:
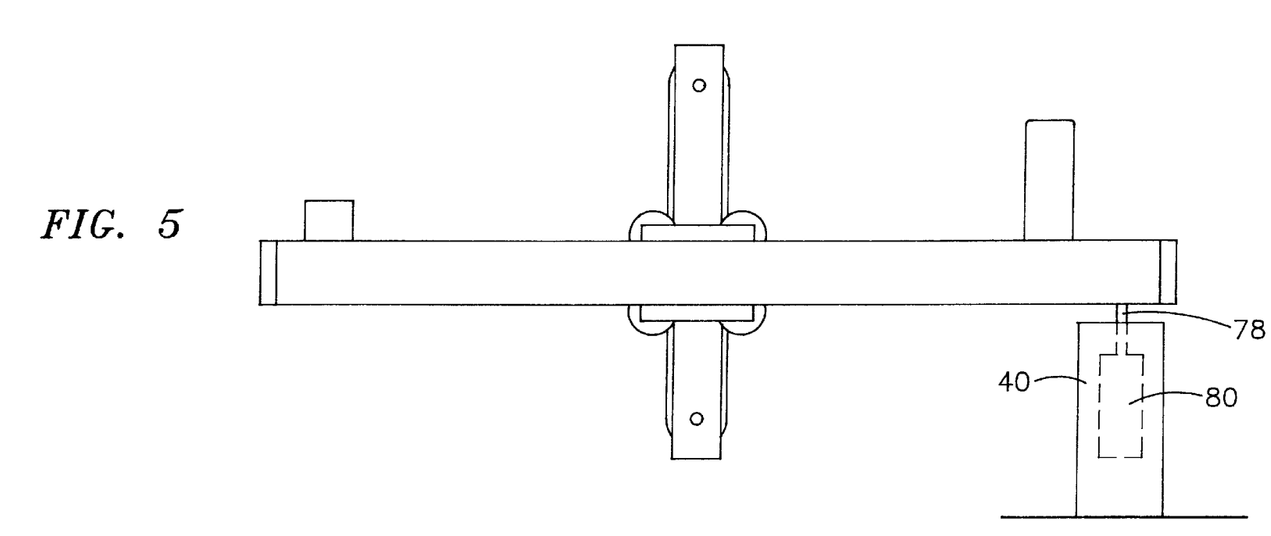
FIG. 5 is a side view showing one alternative embodiment of the Cartesian robot of FIG. 1.

Additionally, because of the central location of the two drive mechanisms, all of the forces acting on the "Z-axis member", second guide member 14 are concentric. As will be apparent to the skilled artisan, although both drive mechanisms 24 and 26 are shown at the same end of first guide member 12, a similarly desirable result could be achieved by centrally locating one of these two drive mechanisms at the opposite of guide member 12. This is achieved by orienting one drive wheel to be perpendicular to the other drive wheel so that both drive belts 46 and 64 are concentric the "Z axis", i.e. there are no side loads applied to the "Z axis" (second guide member 14. The benefit of this arrangement is that with no forces acting off center to the body of Cartesian robot 10 the load rating and size of 22) As previously described, with the foregoing design, all of the drive mechanisms are prfereably located on one end of first guide member 12 or the "X-axis". This is important since now all of the heaviest components (motors, gearboxes, cables, etc.) are located at one end of Cartesian robot 10. This allows for the introduction of a pivot point 78 on support 40, as shown in FIG. 5. In this configuration extremity 18 of Cartesian robot 10 is be supported upon a caster mechanism 92 driven by yet a third drive mechanism 94 that drives caster 96 allowing rotation in a semi-circular pattern around pivot point 78 which can provide a limited "Y-axis" motion. There are many application for devices of this type that require only limited "Y-axis" motion such as belt tracking for pick and place on-the-fly case packing.

23) As a further enhancement of Cartesian robot 10, the entire device could be rotated about pivot point 78 with a rotary motion drive mechanism 80 (shown in phantom in FIG. 7) that would again be fixed and co-located with the other drive mechanisms. In this configuration, first guide member 12 would be strengthened and leaving end 18 unsupported and free to rotate 360° about pivot point 78. This configuration would be useful in, for example, a palletizer robot that picks up boxes and the like from several incoming conveyors and stacks them on top of each other on a pallet. Other similarly applied robots require more expensive and heavier components to accomplish the same tasks and freedom of movement.

Figure 7:
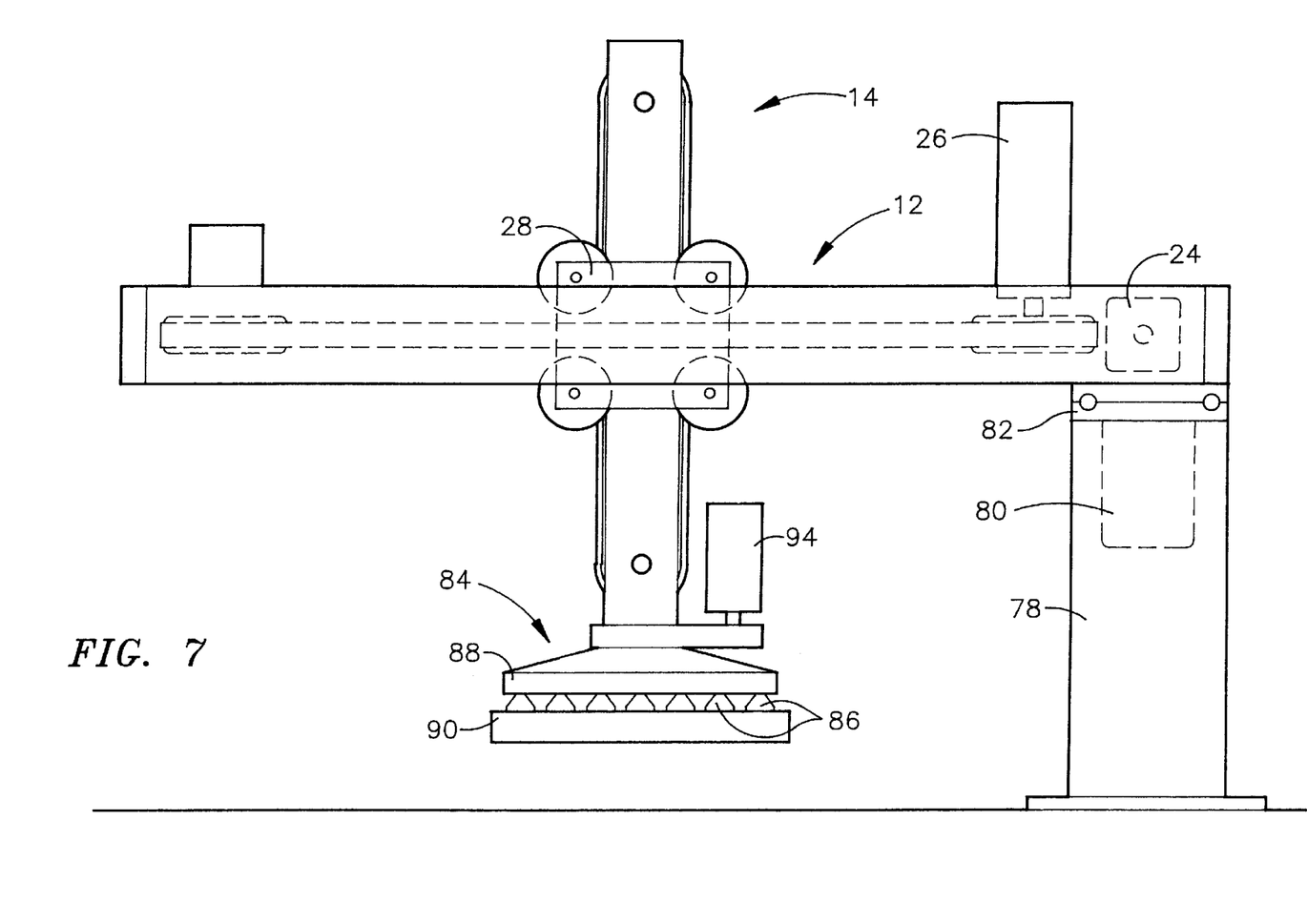
FIG. 7 is a gross-sectional view of an alternative preferred embodiment of the Cartesian robot of the present invention.

24) A more detailed depiction of such a palletizer robot is shown in FIG. 7. According to this embodiment, First guide member 12 is mounted on pivot 78 (a hollow tube) at ring bearing 82 and is rotated by drive mechanism or motor 80. A vacuum activated fixture 84 comprising a vacuum housing or head 88 and vacuum operated suction cups 86 are provided at extremity 20 of second guide member 14 to permit picking up of a body 90 that is to be moved. Vacuum hosing or head 88 is fully rotatable by drive mechanism 92. According to this embodiment, activation of a vacuum circuit permits body 90 to be picked up by suction cups 86, moved by robot 10 to a new location as described above and rotated for placement in a new location and release of the vacuum on suction cups 86.

25) According to a highly preferred embodiment of the present invention, the open areas within first and second guide members 12 and 14 by virtue of the engagement of second guide member 14 with carriage 28 could be used as "conduits" for the routing of, for example, vacuum hoses and other tool activation or control components. Such an arrangement provides a protected routing for such components that are easily installed and accessed for repair within first and second guide members 12 and 14. Such an arrangement is particularly useful in applications such as the palletizer robot described above.

26) As will be clearly apparent to the skilled artisan, drive mechanisms 24 and 26 are preferably servo motors that can be accurately advanced and reversed and include encoders and detectors for the accurate determination of drive belt position for purposes of control accuracy. Such devices are well known in the art and consequently, no extended discussion thereof will be presented herein.

27) As the invention has been described, it will be apparent to those skilled in the art that the same can be varied in many ways without departing from the spirit and scope of the invention. Any and all such modifications are intended to be within the scope of the appended claims.

What is claimed is:

1. A Cartesian two-axis robot comprising:
   A) a first guide member extending along a first direction attached to a stationary fixed point and having proximal and remote ends;
   B) a hollow carriage that is translatably supported on the first guide member and has a centerline;
   C) a second guide member that extends in a second direction perpendicular to the first direction, penetrates said hollow carriage and is supported by the carriage to be moveable in both the first and second direction;
   D) first and second idler pulleys rotatably supported on two ends of the second guide member;
   E) a third idler pulley rotatably supported on the remote end of the first guide member and perpendicular to said first and second idler pulleys;
   F) intermediate pulleys rotatably supported on four corner portions of said carriage parallel to said first and second idler pulleys;
   G) a first drive mechanism on said first guide member at said stationary fixed point that drives a first drive belt having two ends attached to said remote end of said first guide member and is looped in a cross shape on the first and second idler pulleys and the intermediate pulleys;
   H) a second drive mechanism on said first guide member at said stationary fixed point oriented orthogonal to said first drive mechanism and that drives a second drive belt having two ends connected to opposing sides of said carriage and is looped on said third idler pulley thereby controlling translational movement of said carriage along said first guide member
      said first and said second drive mechanisms all acting along the centerline of said carriage.

2. The Cartesian robot of claim 1 wherein said stationary fixed point comprises a pivot point.

3. The Cartesian robot of claim 2 wherein said pivot point comprises a drive mechanism capable of rotating said Cartesian robot about said stationary fixed point.

4. The Cartesian robot of claim 1 wherein said intermediate pulleys are separately mounted upon shafts attached between pairs of wheels that include shoulder portions that engage said second guide member and thereby simultaneously serve to guide said second guide member in its movement is the second direction.

5. The Cartesian robot of claim 1 wherein said drive mechanisms are servo motors.

6. A two axis, two drive mechanism, two belt Cartesian robot comprising:
   A) a first guide member having a first fixed end and a second remote end;
   B) a first drive mechanism located at said fixed end;
   C) a second drive mechanism located at said fixed end orthogonal to said first drive mechanism;
   D) a first idler pulley at said remote end;
   E) a track on said first guide member;
   F) a carriage having an aperture therein and including wheels that engage said track and permit said carriage to longitudinally traverse said first guide member;
   G) a second guide member having opposing ends oriented perpendicular to said first guide member and that penetrates said aperture;
   H) second and third idler pulleys located at said opposing ends;
   I) intermediate pulleys located at four corners of said carriage;
   J) a first drive belt having opposing ends attached to said remote end, driven by said first drive mechanism and looped in a cross shape on said second and third idler pulleys and said intermediate pulleys;
   K) a second drive belt driven by said second drive mechanism, attached to opposing sides of said carriage and looped about said first idler pulley such that activation of said second drive mechanism causes said carriage and said second guide member to move along said first guide member.

7. The two axis, two drive mechanism, two belt Cartesian robot of claim 6 wherein said stationary fixed point comprises a pivot point.

8. The two axis, two drive mechanism, two belt Cartesian robot of claim 7 wherein said pivot point comprises a drive mechanism capable of rotating said Cartesian robot about said stationary fixed point.

9. The two axis, two drive mechanism, two belt Cartesian robot of claim 6 wherein said intermediate pulleys are independently mounted on shafts joining pairs of guide wheels that include shoulder portions that engage said second guide member and thereby simultaneously serve to guide said second guide member in its movement is the second direction.

10. The two axis, two drive mechanism, two belt Cartesian robot of claim 6 wherein said drive mechanisms are servo motors.

11. A two axis, two drive motor, two belt Cartesian robot comprising:

A) a first guide member that extends along a first direction and is attached to a stationary fixed point;

B) a hollow carriage that is translatably supported on the first guide member having a centerline and driven by a first drive belt that is driven by a first guide motor;

C) a second guide member that extends in a second direction perpendicular to the first direction, penetrates said hollow carriage, is supported by the carriage to be moveable in both the first and second directions and is driven by a second drive belt that is driven by a second drive motor;

wherein both said first and said second drive motors are located at said fixed point and are oriented orthogonal to each other, and said first and said second drive mechanisms act along said centerline.

12. The two-axis, two drive belt, two drive motor Cartesian robot of claim 11 further comprising:

I) a remote end on said first guide member and a first idler pulley at said remote end;

II) a track on said first guide member;

III) an aperture in said carriage and including wheels on said carriage that engage said track and permit said carriage to longitudinally traverse said first guide member;

IV) opposing ends on said second guide member oriented perpendicular to said first guide member;

V) second and third idler pulleys located at said opposing ends;

VI) intermediate pulleys located at four corners of said carriage;

VII) said second drive belt having opposing ends attached to said remote end, driven by said second drive motor and looped in a cross shape on said second and third idler pulleys and said intermediate pulleys; and VIII) said first drive belt attached to opposing sides of said carriage and looped about said first idler pulley such that activation of said first drive motor causes said carriage and said second guide member to move along said first guide member.

13. The two axis, two drive mechanism, two belt Cartesian robot of claim 12 wherein said stationary fixed point comprises a pivot point.

14. The two axis, two drive mechanism, two belt Cartesian robot of claim 13 wherein said pivot point comprises a drive mechanism capable of rotating said Cartesian robot about said stationary fixed point.

15. The two axis, two drive mechanism, two belt Cartesian robot of claim 12 wherein said intermediate pulleys are independently rotatably mounted on shafts joining guide wheel pairs that include shoulder portions on said guide wheels that engage said second guide member and thereby simultaneously serve to guide said second guide member in its movement is the second direction.

16. The two axis, two drive mechanism, two belt Cartesian robot of claim 11 wherein said drive mechanisms are servo motors.

17. The two axis, two drive mechanism, two belt Cartesian robot of claim 1 further including a tool attached to one end of said second guide member.

18. The two axis, two drive mechanism, two belt Cartesian robot of claim 17 wherein said tool comprises a rotatable, vacuum activated head.

19. The two axis, two drive mechanism, two belt Cartesian robot of claim 6 further including a tool attached to one end of said second guide head.

20. The two axis, two drive mechanism, two belt Cartesian robot of claim 11 further including a tool attached to one end of said second guide member and wherein said tool comprises a rotatable, vacuum activated head.

21. The two axis, two drive mechanism, two belt Cartesian robot of claim 12 further including a tool attached to one end of said second guide member and wherein said tool comprises a rotatable, vacuum activated head.

* * * * *

UNITED STATES PATENT AND TRADEMARK OFFICE
CERTIFICATE OF CORRECTION

PATENT NO. : 6,626,630 B1
DATED : September 30, 2003
INVENTOR(S) : Roland Lomerson, Jr. et al.

It is certified that error appears in the above-identified patent and that said Letters Patent is hereby corrected as shown below:

<u>Title page,</u>
Item [75], "Geoffrey James Parnel" is changed to -- Geoffrey James Parnell --.

Signed and Sealed this

Thirtieth Day of December, 2003

JAMES E. ROGAN
*Director of the United States Patent and Trademark Office*